United States Patent Office 2,885,444
Patented May 5, 1959

2,885,444

OXIDATION OF 2,4-DI-TERTIARY-ALKYL-PHENOLS WITH OXYGEN

James Hiram Fookes, Hope, and Earl Lyman Pelton and Merton Wayne Long., Jr., Midland, Mich., assignors to The Dow Chemical Company, Midland, Mich., a corporation of Delaware No Drawing. Application March 5, 1958
Serial No. 719,209

5 Claims. (Cl. 260—620)

This invention concerns a method for oxidizing 2,4-di-tertiary-alkylphenols wherein the tertiary-alkyl group is tertiary-butyl or tertiary-amyl hereinafter designated as 2,4-DTBP and 2,4-DTAP, respectively, to the corresponding 4,4',6,6'-tetra - tertiary - alkyl - o,o' - biphenols. More particularly, it concerns an oxidation process carried out at an alkaline pH wherein oxygen or an oxygen containing gas is used to oxidize 2,4-DTBP or 2,4-DTAP to the corresponding 4,4',6,6'-tetra-tertiary-alkyl-o,o'-biphenols.

The oxidation of 2,4-DTBP or 2,4-DTAP to the corresponding 4,4',6,6'-tetra-tertiary-alkyl-o,o'-biphenol with such oxidizing agents as nitric acid, sodium dichromate, etc. is known, but the products are contaminated with considerable amounts of nitro compounds, quinone, etc. which must be removed. It was surprising, therefore, to discover that 2,4-DTBP and 2,4-DTAP can be oxidized cleanly and rapidly directly to the 4,4',6,6'-tetra-tertiary-alkyl-o,o'-biphenol without substantial discoloration or formation of troublesome impurities.

The process of the present invention thus oxidizes 2,4-DTBP or 2,4-DTAP in admixture with fluid water and alkali metal hydroxide, i. e., in admixture with an aqueous solution of an alkali metal hydroxide, or in admixture with steam and alkali metal hydroxide, directly to the said biphenol with excess of oxygen as such or in the form of an oxygen-containing gas, at atmospheric, substantially atmospheric (i. e., between 740 and 780 mm. Hg) or superatmospheric pressure up to about 1250 p.s.i.g. A reaction temperature between about 20° C. and 300° C. is advantageously used. The reaction rate is proportional to the partial pressure of the oxygen and increases with temperature.

The quantity of alkali metal hydroxide solution used is that which gives the physical properties required by the stirring apparatus. If the reaction is run as a thin slurry, proportions from about 200 to 800 g. of 2,4-DTBP or 2,4-DTAP per kilogram of water containing between 5 and 1200 g. of one or more alkali metal hyroxides give good results. Lesser proportions of the phenol are operable, even approaching zero as an asymptote, but are clearly not economic. If the reaction is to be run as a thick, cohesive paste which can be mixed without crumbling, e.g., in a dough mixer at room temperature, a weight of the phenol as high as 2 or 3 times that of said alkali metal hydroxide solution is used.

The presence of an aqueous alkali metal hydroxide solution is essential. When air is contacted with a mixture of 2,4-DTBP or 2,4-DTAP and water, no appreciable oxidation to the corresponding 4,4',6,6'-tetra-tertiary-alkylphenol takes place. When the 2,4-DTBP or 2,4-DTAP in admixture with a solution of alkali metal hydroxide is contacted with an oxygen-containing gas, the rate of absorption of oxygen depends upon the concentration of the alkali metal hydroxide solution. At low concentrations of alkali metal hydroxide, absorption of oxygen is slow; as the concentration of alkali metal hydroxide is increased, the rate of absorption is increased, until a maximum rate is reached, above which the rate of absorption of oxygen decreases, and eventually becomes very slow. The oxidation of the phenol is proportional to the rate of absorption of oxygen. At very high concentrations of alkali metal hydroxide solution, i.e., KOH containing 10 to 30 percent of its weight of water, the rate of oxidation is negligible even at 200°–300° C. Inert diluents or thinners such as mono- or dichlorobenzene can be added to the reaction mixture to reduce its viscosity and to keep the phenol, alkali metal phenate and biphenol in solution or emulsion. The effect of concentration of the KOH solution on the rate of oxidation of the phenol in a slurry at 80° C. is illustrated in the following table:

| Grams KOH per Liter of Water | Approximate Relative Reactivity |
|---|---|
| 100 | 10 |
| 170 | 20 |
| 190 | 27 |
| 200 | 32 |
| 310 | 39 |
| 570 | 30 |
| 715 | 19 |
| 1,040 | 3 |

The effect of sodium hydroxide and cesium hydroxide is quite similar to that of potassium hydroxide for a given concentration of alkali metal hydroxide. Lithium hydroxide is similar, but because of its low solubility, the maximum rate of oxygen absorption reached is not very high. Sodium hydroxide, especially at the higher concentrations, gives a slurry which tends to cake on the surface of the reaction vessel where it splashes above the stirred liquid, while potassium and cesium hydroxides give slurries which contain softer material which washes down more easily. The product from reactions with potassium hydroxide tends to be a little lighter in color than that from reactions with sodium hydroxide, and to be a desirable finer grained particle size, but similar material can be obtained with sodium hydroxide. In general, the rate of oxidation in KOH solution tends to be maintained better than in NaOH solution, possibly because of occlusion of the phenol by the relatively harder sodium phenate. This difficulty can be minimized, however, by the addition to the reaction mixture of a small amount, e.g., about 10 weight percent, phenol basis, of an inert diluent, such as mono- or dichlorobenzene or a mixture of them.

When the reaction is run as a thick, cohesive paste in a dough-type mixer, the rate of oxidation is relatively slower, and if the mass is permitted to become dry, runaway oxidation can occur resulting in much decomposition and none of the desired product. Because of the ease of handling, of providing a large surface of contact between the oxygen containing atmosphere and the caustic solution-phenol slurry, and the ease of subsequent working up, it is preferable to run the reaction as a slurry, with an agitator which gives rapid change of surface.

Since the caustic is not consumed by the reaction, the product can be filtered from it, and the caustic solution returned to the process. The reaction is, therefore, advantageously carried out as a continuous countercurrent operation, in which caustic solution is continuously recycled.

A commercial grade 2,4-DTBP or 2,4-DTAP is advantageously used, since their inert impurities can be easily removed from the product, along with the unreacted 2,4-DTBP or 2,4-DTAP by steam distillation. The presence of the common heavy metals or their oxides or hydroxides does not appear to have any appreciable effect on the reaction.

In practice, the solution of alkali metal hydroxide, advantageously in a reactor having a stirrer which produces vigorous agitation of the surface, is generally heated to reaction temperature, and the phenol in molten condition is added quickly. A slurry comprising alkali metal hydroxide solution and alkali-metal phenate is thereby produced. Oxygen or an oxygen-containing gas is admitted to the reactor until reaction to biphenol is substantially complete. The reaction is run at a temperature at which the vapor pressure of the alkali metal hydroxide solution is substantially below the pressure employed, so that an adequate partial pressure of oxygen is maintained in the reactor. This can be calculated readily from the oxygen content of the gas used, and the vapor pressure of the alkali metal hydroxide solution. (International Critical Tables 3, 370–373.) In general, when the reaction is run at atmospheric or substantially atmospheric pressure, partial pressures of oxygen of 100 to 500 mm. Hg give satisfactory results.

At the conclusion of the reaction, the reactor charge has become a slurry of fine particles, practically free of drops of oily, melted 2,4-DTBP or 2,4-DTAP. The slurry is filtered, and the biphenol product is washed free of alkali metal hydroxide with hot water, and steam distilled in the presence of a small excess of mineral acid, e.g., at a pH of about 2 to 4, to remove unreacted phenol and impurities. The product is a pale yellow powder (or fine pellets, depending on conditions of oxidation) and is sufficiently pure for most uses. Traces of color-yielding higher oxidation products can be reduced or eliminated by washing with a little methanol in the case of 2,4-DTBP and a pure white, chemically pure 4,4',6,6'-tetra-tertiary-butyl-o,o'-biphenol can be made by subsequent crystallization from methanol. In the case of 2,4-DTAP, a reduction step such as is used to reduce quinones to phenols (zinc dust in acetic acid, for example) can be used if traces of color or higher oxidation products are objectionable.

Alternatively, the reaction can be carried out at elevated temperatures up to 300° C. and superatmospheric pressures up to 1250 p.s.i.g. wherein the water then exists as steam.

Examples both of atmospheric pressure and superatmospheric pressure reactions are given in the examples.

The following non-limitative examples give specific embodiments and show advantages accruing from the practice of this invention:

Example 1

A quantity of 32 g. of caustic soda pellets (97 percent) was dissolved in 160 g. of water contained in a 500 ml. glass reaction flask immersed in a heating bath and provided with a stirrer, vacuum connection, oxygen inlet and differential water manometer. The bath temperature and caustic solution were heated to 80° C., and 20.6 g. (0.1 mole) of commercial grade 2,4-DTBP, ca. 95 percent, was added. The mixture was stirred slowly under 290 mm. Hg absolute pressure. The system was closed and oxygen was bled into the system to atmospheric pressure, as shown by the differential water manometer. The amount of oxygen was 122 ml. S.T.P. The stirrer was speeded up and the oxygen pressure increased to 30 mm. of water. This pressure was maintained through the run. Data were obtained every 10 minutes. When the oxygen absorption rate became 0.5 ml. per minute or less, the reaction was considered complete. This required about 4 hours. The pressure was then returned to atmospheric, and the oxygen absorbed was recorded along with the temperature and barometric pressure. In this run the oxygen used was 538 ml. S.T.P. This corresponds to about 0.24 mole of $O_2$ per mole of the phenol, as used. The reaction flask contents was poured into a 3-liter 1-necked flask. A quantity of 60 ml. of concentrated phosphoric acid and approximately 2 liters of water was added. The unreacted 2,4-DTBP was steam distilled from the solid biphenol. After approximately two liters of water had distilled off, the distillation flask contents was cooled and the biphenol was filtered, water washed and dried. The unreacted 2,4-DTBP was extracted from the steam distillate with approximately 50 ml. of ethyl ether. The yield of product was 19.8 g. or 96.6 percent, 2,4-DTBP basis. It was identified as 4,4',6,6'-tetra-tertiary-butyl-o,o'-biphenol by its infrared spectrum. The product was a pale yellow solid which melted at 193–195° C. Comparative runs made at 60°, 70° and 90° C. gave similar results.

Example 2

A charge of one liter of water, 500 g. of KOH pellets (85 percent) and 206 g. (1 mole, not corrected for purity) of commercial 2,4-DTBP (m. 54° C. purity 95–98 percent) was added to a 5-liter flask having dimpled sides to improve agitation, an air driven stainless steel stirrer, and openings through which air could be passed in and out. The charge was heated to 80° C., stirred vigorously, and air was passed in continuously above the surface of the slurry, and continuously vented. At 80° C., there was very little vaporization from the reactor, and no reflux condenser was necessary, but ventilation was provided so that there was no odor of 2,4-ditertiary-butylphenol, because this is quite irritating to the nose and throat. After running for about 3½ hrs., the rate of oxygen absorption became very slow, and the run was stopped. The batch was a slurry of solid, light cream-colored biphenol, in quite fine grains. The batch was filtered at room temperature, washed with distilled water, and stream distilled in water made acid with a little 85 percent phosphoric acid, until free of volatile phenol. The biphenol was filtered, and dried in a vacuum oven at 60° C. The product was a fine, light cream-colored, powder, melting at 186–8° C. and weighing 190 g.

Example 3

A charge of one liter of water, 400 g. KOH pellets (85 percent) and 824 g. of commercial grade 2,4-DTBP was oxidized as in Example 2. The rate of oxygen absorption was about 1½ times that in Example 2, and the batch was 60 percent oxidized at the end of 7 hours.

Example 4

A quantity of 1227 g. of molten 2,4-DTBP was put into a small mixer, and let crystallize while stirring. A solution of 200 g. 85 percent KOH in 500 ml. water was then added, producing a quite stiff, cohesive, non-crumbling paste. Steam was admitted to the jacket sufficient to keep the temperature at about 40° C. After 16 hours, the batch was a fine, light yellow, dry powder, with some darker streaks of color. The phenol was then substantially all oxidized to biphenol.

Example 5

A quantity of 1168 g. of molten 2,4-DTBP was poured into a cold small mixer, and let crystallize while stirring. A cold solution of 200 g. KOH 85 percent in 500 ml. water was added at one time. The contents warmed to ca. 30° C. when mixed, and an additional 200 g. KOH 85 percent dissolved in 200 ml. of water and 500 g. of ice was added. The batch was a stiff, cohesive paste which was mixed in a dough mixer at room temperature, about 20° C., without crumbling. At the end of 6½ hrs. the batch was 8 percent oxidized and at the end of 21½ hrs. of room temperature oxidation, it was 19 percent oxidized.

Example 6

Into a 5-liter, four-necked flask, provided with a stirrer, stuffing box, air inlet, thermometer, reflux and collecting condenser, was placed 1000 ml. water, 200 g.

NaOH (99.2 percent), and 217 g. of commercial grade 2,4-DTBP. The temperature was adjusted and maintained at ca. 80° while stirring, and air (CO₂ free) was passed in at about 217 ml./min. After about 24 hours, total running time, the slurry was diluted with 2 liters of cold water, filtered, the filter cake washed with 1½ liters of hot water, then steam distilled until free of volatile phenol, and dried in a vacuum oven. The product biphenol weighed 195 g., a yield of 90.3 percent.

The following example and table is a report of six runs made at 120°–260° C. at superatmospheric pressures.

Example 7

A 2-liter monel Parr bomb was loaded with 175 g. of 85 percent potassium hydroxide (2.66 mole) and 475 g. of water to make a 20–22 percent solution (ca. 300 g. KOH liter of water). A quantity of 103 g. (0.5 mole) melted 2,4-DTBP was added, the bomb was sealed and connected to the equipment. Since the oxygen orifice was calibrated at 500 p.s.i.g., it was necessary to keep the pressure of the bomb slightly below 500 p.s.i.g., preferably at 450 p.s.i.g., to prevent a possibility of flowback. At 50° C., the bomb was evacuated to a pressure of 70 mm. of Hg to remove air. Heating was continued to 260° C. and 450 p.s.i.g. When heating equilibrium was reached, 4.0 g. of oxygen (theoretical amount) was added at the rate of 0.2 g. per minute for 20 minutes. After the oxygen had been added, heating was continued for one hour at 260° C. The bomb was then cooled to 25° C. The bomb was emptied and flushed with denatured ethanol to remove the product. The alcohol was evaporated from the product, and the solution was neutralized with 230 ml. of concentrated hydrochloric acid. The 2,4-DTBP was steam distilled from the product and recovered. The product 4,4',6,6'-tetra-tertiary-butyl-o,o'-biphenol was filtered, washed with water and dried. It weighed 37.1 g. The product was a medium brown in color. The percent yield was 36 percent. Data concerning this and five other runs are tabulated in the following table:

| Run No. | Reaction Conditions | | | Product Biphenol | |
|---|---|---|---|---|---|
| | DTBP, grams | Temp., °C. | Pressure, p.s.i.g. | Grams | Percent Yield |
| 1 | 103 | 120 | 10 | 27.5 | 27 |
| 2 | 103 | 150 | 30 | 60 | 59 |
| 3 | 103 | 180 | 90 | 65 | 64 |
| 4 | 103 | 210 | 195 | 49.5 | 48.5 |
| 5 | 103 | 233 | 295 | 60.5 | 59 |
| 6 | 103 | 260 | 450 | 37.1 | 36 |

Example 8

Into a 5-liter, four-necked flask provided with a stirrer, stuffing box, air inlet, thermometer, reflux and collecting condenser was placed 1000 ml. water, 400 g. KOH (85 percent) and 702 g. of commercial grade 2,4-di-tertiary-amylphenol (80 percent, the balance being substantially all 2,4-di-sec-butylphenol). The reaction temperature was maintained at about 79° C. while stirring and CO₂-free air was passed in at about 220 ml./min. After 9 hours, the batch had become a thick, brownish-yellow mush. The batch was acidified, washed with water and steam distilled to remove impurities. The residue was a light yellow liquid, identified by infrared as a biphenol. Its boiling range was 190°–270° C. at 0.4 mm. Hg. Yield was 91.7 percent dialkylphenol basis. A sample was bleached to light lemon-yellow color by reduction with zinc dust in acetic acid.

We claim:

1. A method of making a 4,4',6,6'-tetra-tertiary-alkyl-o,o'-biphenol which method comprises reacting a mixture of an aqueous solution containing between 5 and 1200 g. of at least one alkali metal hydroxide per kilogram of water and a 2,4-di-tertiary-alkylphenol of the group consisting of 2,4-di-tertiary-butylphenol and 2,4-di-tertiary-amylphenol in proportions ranging between those which form a thick, cohesive paste which can be mixed without crumbling and those having a proportion of less than one mole of said 2,4-di-tertiary-alkylphenol per kilogram of water containing between 5 and 1200 g. of at least one alkali metal hydroxide while contacting said mixture with an oxygen-containing gas in amount sufficient to oxidize the 2,4-di-tertiary-alkylphenol to the corresponding 4,4',6,6'-tetra-tertiary-alkyl-o,o'-biphenol at a reaction tempertaure between about 20° and 300° C. and at a reaction pressure between substantially atmospheric and about 1250 p.s.i.g. and recovering said 4,4',6,6'-tetra-tertiary-alkyl-o,o'-biphenol.

2. The method of claim 1 wherein the reaction is carried out at substantially atmospheric pressure and at a temperature between about 20° and 100° C.

3. The method of claim 1 wherein the reaction is carried out at a superatmospheric pressure up to about 1250 p.s.i.g. and at a temperature above 100° C. up to about 300° C.

4. The method of claim 1 wherein the phenolic reactant is 2,4-di-tertiary-butylphenol.

5. The method of claim 1 wherein the phenolic reactant is 2,4-di-tertiary-amylphenol.

References Cited in the file of this patent

UNITED STATES PATENTS 2,479,948    Luten et al.    Aug. 23, 1949

OTHER REFERENCES

Moore et al.: Jour. Chem. Soc. (January 1954), p. 243.